April 7, 1953 J. F. LANGAN 2,633,655

RECORD CARD

Filed Aug. 14, 1945

INVENTOR.
JOHN F. LANGAN
BY
Pennie Davis Marvin Edmonds
ATTORNEYS

Patented Apr. 7, 1953 2,633,655

UNITED STATES PATENT OFFICE 2,633,655

RECORD CARD

John F. Langan, Washington, D. C., assignor, by mesne assignments, to Filmsort, Inc., a corporation of Delaware Application August 14, 1945, Serial No. 610,812

5 Claims. (Cl. 40—158)

This invention relates to record cards adapted for mounting microfilm, still and motion picture film, pictures, and the like.

In my co-pending application 592,981 filed May 10, 1945, I have disclosed a card record system for the classification and cataloging of collections of microfilm, still and motion picture film, and the like. According to the disclosure of that application, microfilms, for example, are mounted in cards perforated for use with electrical card handling machines, such as sorters, of types that are well known and in general use in business houses.

The present invention relates to record cards such as may be used in the record card system described in my aforesaid application, and which are adapted for mounting microfilm, still and motion picture film, pictures, and the like. The invention also contemplates a new and novel form of record card with the microfilms, etc., mounted on them, and the method of producing the cards with the microfilm or the like mounted on them.

While the record cards of this invention are particularly adapted for use in the formation of film libraries and the like, for use with well known types of card handling machines, their use is not so limited and they may be used, if desired, in connection with the formation of ordinary alphabetical or other card index systems, for the individual mounting of transparencies such as result from the development of pictures taken on the so-called "color" film, or anywhere it is desired to mount a film, picture, or the like, on a card for future reference. However, the greatest usefulness of the record cards of the present invention appears at the present time to be in record card systems of the type previously described. In such systems the films or other transparencies are mounted in apertures in the cards so that they may be projected. In such cases it is important that all of the edges of the films or transparencies should be firmly bound and secured to the record card so that they do not project from either face of the card. As such cards frequently are stacked by the thousands it also is important that the means for securing the films or transparencies within the apertures in the record cards shall not add to the over-all thickness of the card at the place where the film or transparency is mounted. Hence, an important feature of the present invention is the production of a record card of the type described in which the film, transparency or the like is so mounted in the aperture in the card that the over-all thickness of the card at the place of mounting of the film or the like is not increased to any extent whatever. Such cards with the films, etc., mounted in them present no projecting portions which may cause one card to catch on another; neither do they prevent the cards from lying perfectly flat against one another when they are stacked.

More specifically, the present invention comprises a record card having an aperture therein with the marginal portions of the card surrounding the aperture rabbeted or otherwise shouldered, for receiving the marginal portions of the film, transparency, etc., which is secured therein by means of a plastic seal, and to the method of making such cards in which the marginal portions of the cards around the aperture are shouldered and a thermoplastic film, transparency, or the like is placed over the aperture with the margins thereof resting on the shoulders surrounding the aperture, and then sealed in place under pressure by a hot die which causes a softening of the marginal portions of the film with concomitant thermal sealing of those portions to the shouldered portions surrounding the aperture.

The invention will be further described in connection with the accompanying drawings, but it is to be understood that such further description is by way of exemplification and the invention is not limited thereto except in the manner set forth in the appended claims.

Figure 4:
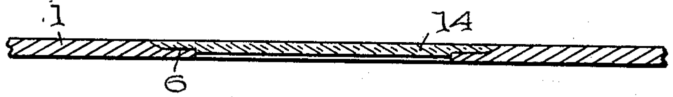
Figure 5:
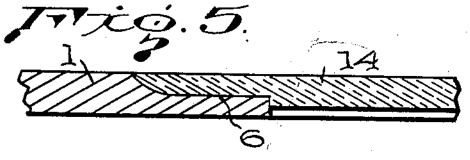

Fig. 4 is a sectional view on an enlarged scale through one of the record cards with a film, transparency, or the like secured over the aperture in the card, and with the margins of the film, transparency, or the like making a plastic seal with the shouldered margins surrounding the aperture in the card; and Fig. 5 is a sectional view on a still further enlarged scale of a portion of the card shown in Fig. 4.

Figure 1:
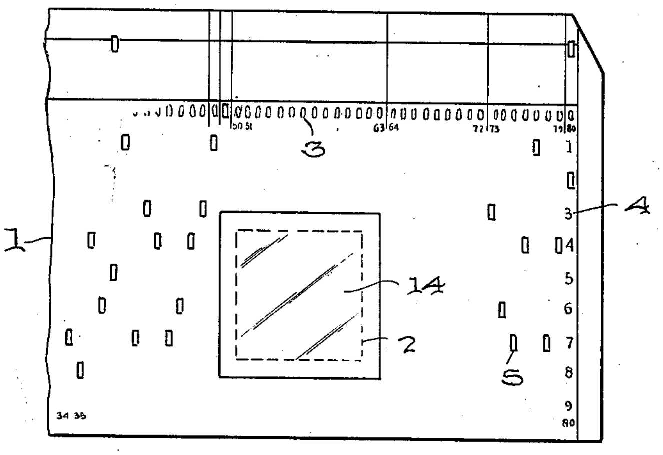
Fig. 1 is a plan view of one end of the record card of the present invention with a film, transparency, or the like secured in the aperture therein.

Referring now to the drawings, Fig. 1 shows one end of a statistical card 1 of a type now commonly in use in connection with electrical card handling machines. The card is of the usual rectangular shape and is made of thin, flexible material, such as calendered paper, and has an aperture 2 formed therein in accordance with the present invention. In order to best function in the record card systems in which the cards are adapted to be used, and in order to leave an adequate margin of material between the aperture and the most adjacent edge of the card so that the edge of the card will not crack or break on flexing, the aperture preferably is one inch square and is positioned approximately nineteen thirty-seconds of an inch from the bottom of the card and approximately one and seven-eighths inches from the right hand side thereof.

In accordance with the common practice the card 1 has the usual headings across the top, as indicated generally at 3, and numerals 4 extending down the end of the card and representing horizontal rows. The intersections between the columns and rows are perforated as at 5 according to a code of the characteristics of the film, etc. to be inserted in the card.

Figure 3:
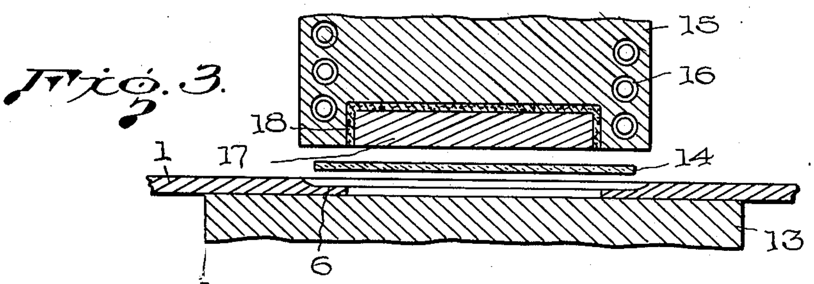
Fig. 3 is a view in section and on an enlarged scale diagrammatically illustrating the manner in which a film, transparency, or the like is secured over the aperture in the record card.

As best shown in Figs. 3, 4 and 5, the portions of the card surrounding the aperture are rabbeted or shouldered as at 6. The shouldered portion may be about one-eighth of an inch wide all around the aperture, as a shoulder of such width provides adequate surface for securing a film, or the like in place and yet does not cover any appreciable portion of the matter depicted on the film. The shouldered portion 6 may be either at the front or the rear of the card, depending on which side it is desired to mount the film. However, I prefer to form it on the front, rather than on the rear.

Figure 2:
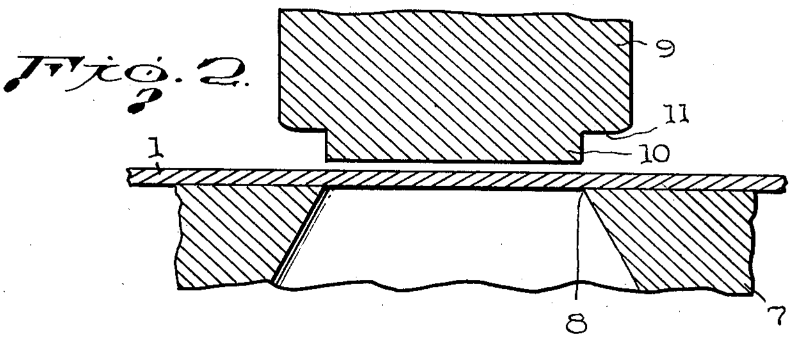
Fig. 2 is a sectional view on an enlarged scale diagrammatically illustrating the manner in which the aperture in the card having the shouldered margins may be formed.

The aperture 2 and the shouldered portions 6 advantageously may be formed simultaneously by a punching and pressing operation as indicated in Fig. 2 wherein an anvil 7 is provided with an opening 8 of the exact size of the aperture 2 in the card. A punching and compressing die 9 is adapted to be reciprocated towards and away from the anvil 7 and has a punching-die portion 10 of the same shape as the opening 8 and of a size such that it just will pass through the opening 8 in the anvil 7. The die 9 is provided with compression shoulders 11 of such width and shape as to form the shouldered portion 6 surrounding the aperture 2 in the card.

In making the cards, one of the usual rectangular cards is placed on the anvil 7, as shown in Fig. 2, with the portion of the card which is to have the aperture formed therein accurately positioned over the opening 8. In order that the apertures in the several cards may be punched at the same place the anvil may be provided with positioning guides of some kind (not shown) so that all of the cards are positioned accurately on the anvil and have the apertures formed at the same location in them. After each card has been properly positioned on the anvil 7 the die 9 is caused to move towards the anvil 7 with such pressure that the punching-die portion 10 is forced through the card and the opening 8 in the anvil and forms the aperture 2, while the compression shoulders 11 compress the material of the card around the opening and forms the shoulders 6, as clearly shown in Fig. 3.

While I prefer to form the shouldered apertures in the card by a simultaneous punching and compression operation, as just described, if desired, the aperture first may be formed by a punching operation and the shouldered portions subsequently formed by a compression operation, or by rabbeting or otherwise.

The punched cards having the apertures 2 and the shoulder 6 surrounding the apertures may be sold in quantity to those desiring to mount films, transparencies, or the like in them, or the shouldered apertures may be formed in the cards by those who mount the films, etc., in them.

When it is desired to mount a film in the card, the card is placed on an anvil 13 and the thermoplastic film, transparency, or the like 14 is placed over the aperture 2 with the margins of the film, transparency, or the like overlapping and resting upon the shoulders 6. A die 15 having edge portion of a size and shape conforming to the marginal portions of the film, transparency, or the like, and heated by an electric coil 16, or otherwise, is then brought down onto the film, transparency, or the like, and the margins of the film, transparency, or the like, pressed against the shouldered portions 6 of the card. During such pressing operation the marginal portions of the film, transparency, or the like, are softened sufficiently to cause them to form a plastic seal with the shoulders 6, with concomitant flow of those portions of the film, transparency, or the like, so that they completely fill the shouldered portions of the card, as clearly indicated in Fig. 4.

The temperature to which the marginal portions of the die are heated will depend upon the temperature at which the composition of the film softens sufficiently to form a plastic seal with the card. If the film is of cellulose acetate a temperature in the edge portions of the die of about 280° F. is adequate to cause sufficient softening thereof to cause the plastic seal to be formed. Higher or lower temperatures may be used, particularly when the film is formed from other thermoplastic compositions.

The die 15 preferably has a smooth, planar, lower surface to engage the film, transparency or the like and is provided with a central section 17 which is heat-insulated by heat insulation 18 from the heated edge portions of the die, so that the central portion 17 is not heated sufficiently to soften the portion of the thermoplastic film which overlies the aperture 2 or to adversely affect the emulsion thereon, if the emulsion side of the film should be uppermost during the mounting operation. Thus, during the mounting of the film, or the like over the aperture 2, the upper surface of the film is maintained planar and caused to lie in the plane of the upper surface of the card, as shown in Fig. 4. The thickness of the cards commonly used in electrical cord handling machines is .0067 inch. I prefer to use cards made from slightly heavier stock, such as calendered stock .0075 inch thick. As shown in the drawings, the depth of the shouldered depression formed in the card has been illustrated for the sake of clarity as being about one-half the original thickness of the card, but this depression may be deeper or more shallow, depending on the material from which the cards are made. If the depth of the depression is less than the thickness of the film, present microfilms usually being 0.005 inch thick, the compression of the margins of the film against the shoulder 6 surrounding the aperture in addition to causing the plastic flow and the plastic or thermal sealing referred to above, also causes the central portion of the film to be forced into the aperture 2, thereby causing the film to be tightly bound to the edges of the card defining the aperture as well as to the shoulders 6 surrounding the aperture.

From the aforegoing description it will readily be seen that the present invention provides for easily and quickly securing films, etc. to mounting cards in a manner such that the film, etc. is contained wholly within the aperture and adjoining shouldered portions of the card so that the over-all thickness of the card and film, etc., mounted therein is no greater than the thickness of the card itself.

The film 14 may be microfilm of accounting records, reports or correspondence, microfilms of maps, drawings, and the like, frames from motion picture film, still picture films, or the like. It may be formed of cellulose acetate or any other sufficiently transparent cellulose derivative, regenerated cellulose, resin, or other material which is thermoplastic so that the margins thereof may be heat-sealed to the shoulders 6 in the manner previously described.

As the over-all thickness of the cards at the place where the films are mounted is no greater than the thickness of the cards at other places, and as the margins of the film are firmly bound to the shoulders 6 surrounding the apertures, the cards with the films mounted in them may be stacked and handled in the usual card handling machines in the same manner as cards without films so mounted in them.

While the present invention is particularly adapted for the mounting of thermoplastic films and other transparencies which may be projected, it is not so limited and contemplates the mounting of paper, cardboard or other pictures, or the like, the edges of which have been rendered thermo-plastic by a coating of thermoplastic material, or otherwise. Hence, in the appended claims the word "film" is used in a broad sense to cover such pictures as well as films made entirely of cellulose derivatives, regenerated cellulose, resins and the like.

I claim:

1. A film record card having an aperture therein with the marginal portions of the card around the aperture shouldered and a thermoplastic film of a size larger than the aperture mounted in said aperture and with its edges overlapping the shouldered portions of the card around the aperture, the card being thicker than the film, and the shouldered portion having a thickness less than that of the film, the marginal portions of the film in said shouldered portion being compressed to a thickness equal to the depth of the shouldered portion and secured thereto, and the central portion of the film extending into the opening below the shouldered portion, said thermoplastic film lying wholly between the planes of the opposite faces of the card.

2. A film record card as defined in claim 1 wherein said central portion of the film is bonded to the peripheral edge of the aperture in the card.

3. A record card or the like comprising a thin paper card having an aperture therein and a depression therein surrounding the aperture, and a film consisting of thermoplastic material, said film having at least a portion thereof extending into said aperture and bonded to the edge of the card forming the periphery of said aperture and having a marginal portion of reduced thickness not greater than the depth of said depression and secured to the card in said depression.

4. A record card as defined in claim 3 wherein the bond between the film and the edge of the aperture is a direct thermoplastic bond.

5. A record card as defined in claim 3 wherein the thicknesses of the card and film are such that opposite surfaces of the film lie between the planes of the opposite faces of the card.

JOHN F. LANGAN.

REFERENCES CITED

The following references are of record in the file of this patent:

UNITED STATES PATENTS

| Number | Name | Date |
|---|---|---|
| 1,257,541 | Sillocks | Feb. 26, 1918 |
| 1,286,199 | Auld | Dec. 3, 1918 |
| 1,467,108 | Hodgson | Sept. 4, 1923 |
| 1,498,895 | Theriault | June 24, 1924 |
| 1,531,249 | Barman | Mar. 24, 1925 |
| 1,617,304 | Groeschel | Feb. 8, 1927 |
| 1,980,687 | Lassen | Nov. 13, 1934 |
| 2,129,686 | Gray | Sept. 13, 1938 |
| 2,165,250 | George | July 11, 1939 |
| 2,184,007 | Staehle | Dec. 19, 1939 |
| 2,201,198 | Monro | May 21, 1940 |
| 2,214,030 | Pereles | Sept. 10, 1940 |
| 2,237,152 | Larmour | Apr. 1, 1941 |
| 2,362,434 | Fitch et al. | Nov. 7, 1944 |

FOREIGN PATENTS

| Number | Country | Date |
|---|---|---|
| 451,241 | Germany | Oct. 22, 1927 |